Patented Sept. 12, 1933

1,926,285

UNITED STATES PATENT OFFICE 1,926,285

METHOD OF THICKENING LATEX AND PRODUCT THEREOF

Albert W. Holmberg and Philip E. Rice, Naugatuck, Conn., assignors to The Naugatuck Chemical Company, Naugatuck, Conn., a corporation No Drawing. Application October 8, 1931
Serial No. 567,761

16 Claims. (Cl. 18—50)

This invention relates to a method of thickening latex without coagulation, and the product thereof.

In the manufacture of rubber articles by dipping and spreading operations, it is desirable to obtain latices of varying viscosities. By dipping methods are manufactured gloves, pen sacs, tubing, fabric, paper, rubber coated articles and the like. By spreading methods are manufactured pile fabric coatings, adhesive coatings, single and double texture coatings, and the like, finger cots, latex lined fire and mill hose, gloves, finger cots, etc. are manufactured by filtration and deposition processes. In all these manufactures the effectiveness of the operation, to a great extent, is dependent on the thickness of the latex used, as well as on the type of compounding ingredients contained therein. Heretofore various methods of thickening natural rubber latex compositions, as distinguished from artificially prepared rubber dispersions, have been carried out with a limited degree of success. In these prior methods of thickening latex the following substances have been added to increase the viscosity: glue, gelatin, gums, starches, dextrins, alginates, caseinates, silica gel, soaps, alkali sulphates and various metallic compounds including litharge, lead thiosulphate, basic lead acetate, lead hydroxide, ferric oxide, ferrous lactate, basic ferric acetate, stannous oxalate, cadmium sulphide. With these various thickening agents a qualitative thickening has been obtained, but to a great extent there has been no accurate method of using these various thickening agents so that with a given latex composition the same viscosity can be obtained each time without further experimentation.

Certain of the substances mentioned tend to cause incipient coagulation in the latex compositions or to settle out on standing. Furthermore considerable difficulty is encountered in obtaining uniform admixing of these substances when treated with the minimum quantity of water necessary to avoid change in solids concentration. In addition many of these substances will remain with the rubber as foreign material or inert fillers susceptible to putrefaction, serving no useful purpose during vulcanization and weakening or discoloring the final rubber films.

This invention relates to a method whereby latex may be thickened to any desired degree quantitatively, that is the desired thickness may be obtained with any latex composition. Our method is applicable to various latices such as normal, concentrated, creamed, evaporated, centrifuged, unvulcanized—with or without vulcanizing ingredients, vulcanized latices, and such latices with or without additional preservatives, stabilizers, peptizing agents, protective agents, curing agents, antioxidants, compounding ingredients, etc.

In carrying out our invention we add to the latex composition a colloidal sulphide and a fixed alkali, preferably colloidal zinc sulphide and sodium hydroxide. In addition to colloidal sulphide and alkali we may, and preferably do, add a small amount of soap which acts as an auxiliary thickener and also as a stabilizer for the latex composition. A small amount of glue may also be added. The colloidal sulphide is preferably formed in situ in the latex, and in the preferred example, colloidal zinc sulphide, we obtain the same by adding to the latex a zinc compound such as zinc oxide, and a polysulphide such as sodium polysulphide. In addition, other compounding ingredients may be added as desired and various ways of introducing the thickening and compounding ingredients will be readily apparent to those skilled in the art.

The following is cited as an example of one method of introducing and mixing the various ingredients to be added which has been found to produce excellent results. This example of carrying out the invention is included merely as one illustration thereof and it is not intended to thereby limit the invention, since many other methods of carrying out the invention will be readily apparent.

1. The latex to be thickened is weighed in a container of sufficient capacity to hold the entire batch or final compound.

2. The sodium oleate is prepared as a 10% aqueous solution, by heating the necessary amounts of water and soap, and added to the latex under agitation after cooling the sodium oleate solution to room temperature.

3. One-half of the total amount of sodium polysulphide solution is then added slowly to the sodium oleate treated latex under agitation. The latex solution at this point will become yellow in color.

4. At this point any accelerator, antioxidant, or softener which is liquid rather than existing as a dry powder, may be added in an emulsified form to the latex, containing sodium polysulphide and sodium oleate prepared under (3). Further, any auxiliary thickening, or stabilizing agents such as starches, gums, caseinates, alginates, etc. may be added at this time to the treated latex.

5. The zinc oxide, glue, and water is then made into a paste and passed through a colloid mill, or is ball milled or paint milled until uniformly dispersed and mixed. Curing ingredients, such as accelerators, or additional sulphur, existing as dry powders, should be added to the above paste prior to the mixing and dispersing step, if they are to be included in the latex compound. It is preferable to use glue in these pastes but not absolutely necessary. The glue is usually dissolved first in hot water before pasting the zinc oxide, sulphur, accelerator, etc. and then the paste is passed through the mixing and dispersing mill at a 50% solids concentration. In addition any dry pigments or filler materials such as lithopone, whiting, carbon black, etc. should be added to the above glue paste. The finished paste is finally diluted with the necessary water required to reduce the solids in the final latex system to 35%. The second half of the sodium polysulphide solution is now added to the diluted paste under vigorous stirring and agitation continued for 20 to 30 minutes until the yellow color has disappeared and the paste has lightened or become white again. This paste is then added to the latex to which has been added the various ingredients as described under (2), (3) and (4) above, under vigorous agitation. The latex compound will become white in color after standing a short while following the period of agitation.

6. The caustic soda preferably in the form of a 25% solution is now added to the treated latex until the correct viscosity or degree of thickening results for any desired temperature, or use.

It will be apparent that certain modifications of the process such as the order of addition and procedure may be made without fundamentally changing the preferred method, and the applicants in no way desire to be limited to the procedure set forth in the example above. For instance, if the presence of the sodium oleate in the latex causes excessive frothing, this material may be added after the charge has become white following the mixing of the paste and latex as described under (5), and prior to the addition of the sodium hydroxide described in (6). Excess foaming may be overcome by mixing the various solutions and paste under warm conditions, as by preheating. If this is done, the thickened latex compound should be cooled to the specified temperature and allowed to stand for a short time before viscosity measurements are taken. The sodium polysulphide is added in two portions to facilitate smoothness in the finished product.

The viscosity may be easily regulated by the amounts of sodium hydroxide added in the final step. In case a finished latex compound is produced having too high viscosity, this may be reduced by addition of small amounts of boric acid or weakly acidic substances in aqueous solution. Boric acid will tend to remove froth in addition. Finally, if the viscosity of such a boric acid treated latex compound is now found to be too low after the treatment, the viscosity may then be increased by the addition of more sodium hydroxide solution.

Several examples of latices treated by preferred method are included, the first showing a normal latex, the second, normal latex with accelerating agents for vulcanization, and the third a creamed latex. The proportions of the various ingredients are by weight. The sodium polysulphide solution as used in the three examples contained 100 parts Na₂S.9H₂O; 50 parts sulphur and 46 parts water.

*Example 1*

To
Normal latex (35% solids) 1% ammoia_ 286
Add
Sodium oleate (10% solution) _____ 10
Add
Sodium polysulphide solution _____ 6
Add as a paste
Blue_____ .25
Water _____ 5
Zinc oxide_____ 5
Sodium polysulphide solution_____ 6
Add
Sodium hydroxide (25% solution)____ 2.15

*Example 2*

To
Normal latex (35% solids) 1% ammoia_ 286
Add
Sodium oleate (10% solution) _____ 10
Add
Sodium polysulphide solution_____ 6
Add as a paste
Blue_____ .25
Water _____ 5
Zinc oxide_____ 5
Sodium polysulphide solution_____ 6
Sulphur_____ 1
Tetramethyl thiuram disulphide_____ 1
Add
Sodium hydroxide (25% solution) _____ 2.15

*Example 3*

To
Creamed latex (60% solids) .5% ammonia _____ 167
Add
Sodium oleate (10% solution)_____ 10
Add
Sodium polysulphide solution_____ 6
Add as a paste
Blue_____ .25
Water _____ 5
Zinc oxide_____ 5
Sodium polysulphide solution_____ 6
Add
Sodium hydroxide (25% solution) _____ 2.15

Films layed down from latices such as shown in Examples 1 and 3 are practically always simply dried and are not used in the vulcanized state. When it is desired to vulcanize the films, extra sulphur over that available in the polysulphide and accelerator are preferably added as shown in Example 2. Other polysulphides such as ammonium and potassium polysulphides may be used in place of sodium polysulphide. Although other sulphides of sodium may be used in place of sodium polysulphide, the latter is preferred. However, it has been found possible to obtain the same type of thickening with a solution of sulphur in sodium hydroxide, although the amount of available sulphur is reduced, due to the lower solubility of sulphur in NaOH as compared with Na₂S. This may be advantageous in the thickening of non-curing latex compounds where excess sulphur is not required in cure. Again it is possible to combine or react the thickening agents prior to adding to the latex but the difficulty in obtaining uniform distribution and smoothness in the finished compound is increased. A further advantage in thickening latices under the proposed method arises in holding zinc oxide, sulphur, fillers, etc. in uniform suspension during application, and producing increased mechanical stability in the latex in regard to stirring and rubbing action as well as preservative qualities. In addition there is an increased resistance to coagulation.

While specific embodiments of the invention have been disclosed, it is obvious that it is capable of numerous modifications, and it is not desired to limit it otherwise than as set forth in the appended claims.

Having thus described our invention, what we claim and desire to protect by Letters Patent is:

1. The process of thickening latex which comprises mixing therewith colloidal zinc sulphide and fixed alkali.

2. The process of thickening latex which comprises mixing therewith colloidal zinc sulphide and sodium hydroxide.

3. The process of thickening latex which comprises mixing therewith zinc oxide, sodium polysulphide, and sodium hydroxide.

4. The process of thickening latex which comprises mixing therewith zinc oxide, sodium polysulphide, soap, and sodium hydroxide.

5. As a new article, uncoagulated thickened latex containing colloidal zinc sulphide and fixed alkali.

6. As a new article, uncoagulated thickened latex containing zinc oxide, sodium polysulphide, and sodium hydroxide.

7. As a new article, uncoagulated thickened latex containing zinc oxide, sodium polysulphide, soap, and sodium hydroxide.

8. The method which comprises thickening latex by mixing therewith colloidal zinc sulphide and fixed alkali removing moisture to recover rubber from the thickened latex, and vulcanizing the recovered rubber.

9. The method which comprises thickening latex by mixing therewith colloidal zinc sulphide and sodium hydroxide, removing moisture to recover rubber from the thickened latex, and vulcanizing the recovered rubber.

10. The method which comprises thickening latex by mixing therewith zinc oxide, sodium polysulphide, and sodium hydroxide, removing moisture to recover rubber from the thickened latex, and vulcanizing the recovered rubber.

11. The method which comprises thickening latex by mixing therewith zinc oxide, sodium polysulphide, soap, and sodium hydroxide, removing moisture to recover rubber from the thickened latex, and vulcanizing the recovered rubber.

12. The method of controlling the thickness of a latex composition which comprises compounding the latex by the mixing therewith materials including colloidal zinc sulphide, and mixing therewith sodium hydroxide until the desired thickness is obtained.

13. The method of controlling the thickness of a latex composition which comprises compounding the latex by mixing therewith materials including sodium polysulphide and zinc oxide and mixing therewith sodium hydroxide until the desired thickness is obtained.

14. The method of controlling the thickness of a latex composition which comprises compounding the latex by mixing therewith materials including sodium polysulphide, zinc oxide and soap, and mixing therewith sodium hydroxide until the desired thickness is obtained.

15. The method of adjusting the thickness of a latex composition which comprises compounding the latex by mixing therewith materials including colloidal zinc sulphide, adding sodium hydroxide, and then adding an acidic material to reduce to the desired viscosity the latex thickened by the addition of the sodium hydroxide.

16. The method of adjusting the thickness of a latex composition which comprises compounding the latex by mixing therewith materials including colloidal zinc sulphide, adding sodium hydroxide to thicken the latex, adding boric acid to reduce the viscosity of the latex, and adding sodium hydroxide to re-thicken the latex until the desired thickness is obtained.

ALBERT W. HOLMBERG.
PHILIP E. RICE.